B. A. LINDEMER.
BOLT.
APPLICATION FILED SEPT. 15, 1919.

1,357,291.

Patented Nov. 2, 1920.

Inventor
Bernhardt A. Lindemer
Edwin B. H. Tower Jr. Atty.

UNITED STATES PATENT OFFICE.

BERNHARDT A. LINDEMER, OF WEST ALLIS, WISCONSIN, ASSIGNOR TO BADGER MANUFACTURING CORPORATION, OF MILWAUKEE, WISCONSIN, A CORPORATION OF DELAWARE.

BOLT.

1,357,291.  Specification of Letters Patent.  Patented Nov. 2, 1920.

Application filed September 15, 1919. Serial No. 324,011.

*To all whom it may concern:*

Be it known that I, BERNHARDT A. LINDEMER, a citizen of the United States, residing at West Allis, in the county of Milwaukee and State of Wisconsin, have invented new and useful Improvements in Bolts, of which the following is a specification.

This invention relates to bolts or attachers.

This bolt is particularly adapted to fasten an automobile bumper bracket to the side bar of the automobile frame, but may be employed for other purposes.

The side bar ordinarily has a web with an upper and lower inwardly projecting, lateral flange. It has been proposed to fasten the bracket to the side bar by means of a hook bolt, the hook of which hooks upon the inner edge of the lower lateral flange with the nut clamping the bracket to the outside of the web.

The ordinary hook bolt fails to satisfactorily serve the purpose, particularly if the bolt becomes loose, as the shank of the bolt is liable to tilt outwardly, thereby releasing the bolt and the bracket.

The only way which has been proposed to keep the shank from tilting downwardly is to have the shank near the hook end engage the bottom of the lower flange near its inner edge, and the end of the hook engage the inside of the lower flange near the web, but that has not been sufficiently secure.

According to this invention the bolt has a hook or jaw which engages the inside of the web and the nut engages the outside of the bracket, either directly or indirectly, so that the bracket and web are gripped or clamped between the nut and the jaw or the end of the hook thus firmly fastening the bracket to the side bar.

Any tendency of the bolt to tilt downwardly is resisted by impingement of the end of the hook at one point on the inside of the web and the nut indirectly at another point on the outside of the web, these points of impingement preferably being widely separated so as to firmly resist tilting.

The jaw is made in the form of a hook so that it will receive the lower lateral flange, but does not engage this flange. When the bracket is being placed in position, the bolt will hold itself against downward displacement with the end of the hook resting upon the lower flange.

Any tendency of the bolt to tilt upwardly is resisted by impingement of the shank with the bottom of the web and the flange, and indirect impingement of the nut on the outside of the web.

An embodiment of this invention is illustrated in the accompanying drawings in which—

Figure 1:
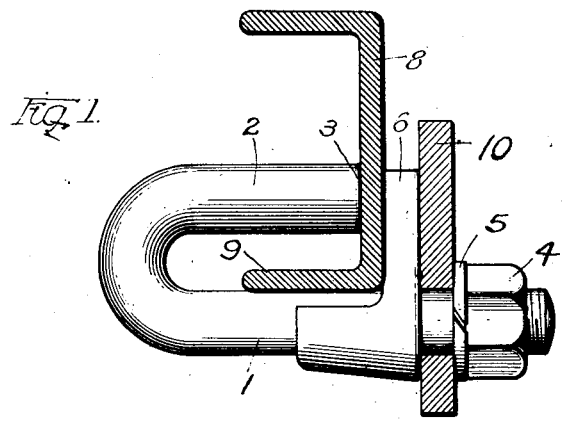
Figure 1 illustrates a side elevation of the bolt applied to a side bar.
Figure 2:
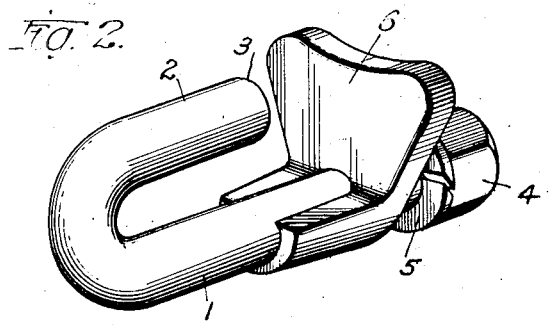
Fig. 2 is a perspective of the bolt and a spacer.

The bolt comprises a shank 1 having at one end a jaw 2 which is in the form of a hook, the end 3 of which constitutes the jaw.

The other end of the shank is threaded and carries a nut 4 which serves as another jaw for the bolt. Ordinarily a lock washer 5 and a spacer 6 are carried by the shank. The spacer has a downwardly extending plate and a lateral sleeve through which the shank passes.

The automobile side bar is illustrated in the form of a channel bar which has a web 8 and a lower lateral flange 9. The bumper bracket 10 is arranged upon the outside of the side bar, the spacer 6 being placed between the bar and the bracket. The nut 4 is arranged on the outside of the bracket 10, the lock washer 5 being placed between the same. When the nut is set the web and the bracket, as well as the spacer and lock nut, are gripped or clamped between the jaw and the nut or other clamping means.

Of course other clamping means may be employed in place of the nut. The spacer may be eliminated, the bumper bracket being placed directly against the bar.

When the bumper bracket is clamped on the side bar by the bolt, if for any reason there is any tendency for the bolt to tilt downwardly, immediately the jaw 3 impinges upon the inside of the web 8 and the nut 4 indirectly impinges upon the outside and near the bottom of the web. It is to be observed that these points of impingement are comparatively widely separated. Therefore when this impingement takes place, the gripping or clamping of the bolt is greatly increased and tilting of the bolt is prevented.

Likewise any tendency of the bolt to tilt upwardly is resisted. Such a tendency to tilt is resisted due to the impingement of the shank 1 against the bottom of the web and flange and the indirect impingement of the web upon the outside of the web. This impingement takes place as soon as there is a tendency of the bolt to tilt upwardly, and increases the gripping or clamping effect of the bolt thereby preventing tilting of the bolt.

Figure 3:
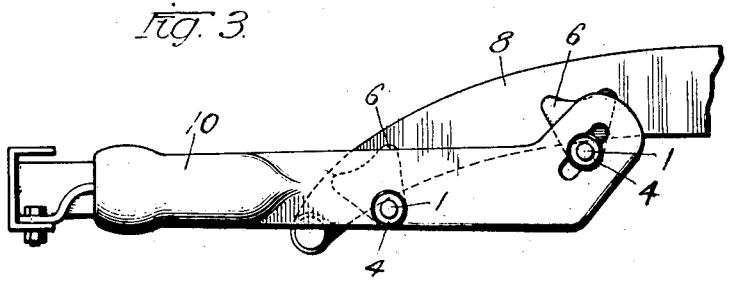
Fig. 3 is a side elevation of the bracket held in place by the bolt.

When the bumper bracket is mounted as shown in Fig. 3 where two bolts are employed for clamping the bracket to the side bar, any weight upon the free end of the bracket causes the bolt at the other end thereof to tend to tilt upwardly and the other bolt to tilt downwardly. On the other hand if an attempt is made to raise the free end of the bracket, or a force is applied thereto from beneath, then the tilting tendency of the bolts is reversed. In either case, the tendency to tilt is resisted in the manner previously described. These bolts therefore hold the bumper bracket firmly in proper position upon the side bar and prevent any displacement of the bumper bracket.

It will be evident that the same results are obtained when the spacer is eliminated and the bumper bracket placed directly against the side bar.

The gripping or wedging effect produced by the impingement of the jaw 3 upon the inside of the web 8 and impingement of the nut 4 upon the outside of the web may be still further increased by serrating or otherwise roughening the face of the jaw 3.

If the nut of the bolt should work loose and a tendency to tilt downwardly result, the bumper bracket would still be held in position on the side bar. The holding of the bracket in place on the side bar under such circumstances is due to the gripping or clamping effect of the bolt resulting from the impingement of the jaw 3 upon the inside of the web 8 and the impingement of the nut 4 upon the outside of the web.

It is obvious that the bolt may be employed for purposes other than for fastening bumper brackets to side bars of automobile frames.

What is claimed is:

1. A bolt adapted to fasten a bumper bracket to an automobile frame side bar, comprising a shank, a jaw at one end thereof and clamping means at the other, the jaw and the clamping means being adapted to grip directly therebetween the bar and the bracket to hold the bracket in place upon the bar, the jaw and the clamping means having points of impingement widely spaced apart to resist tilting.

2. A bolt adapted to fasten a bumper bracket to an automobile frame side bar comprising a shank, a jaw at each end thereof, said jaws being adapted to grip directly therebetween the bar and the bracket to hold the bracket in place upon the bar and having points of impingement widely spaced apart to resist tilting.

3. A bolt adapted to fasten a bumper bracket to an automobile frame side bar comprising a shank, a jaw at one end thereof and an adjustable jaw at the other, said jaws being adapted to grip directly therebetween the bar and the bracket to hold the bracket in place upon the bar, the jaws having points of impingement widely spaced apart to resist tilting.

4. A bolt adapted to fasten a bumper bracket to an automobile frame side bar, comprising a shank, a jaw at one end thereof and a nut at the other, the jaw and the nut being adapted to grip directly therebetween the bar and the bracket to hold the bracket in place upon the bar, the jaw and the nut having points of impingement widely spaced apart to resist tilting.

5. A bolt adapted to fasten a bumper bracket to an automobile frame side bar comprising a shank, a jaw at one end thereof and clamping means at the other, a spacer positioned between the bar and the bracket and carried by the shank, the jaw and the clamping means being adapted to grip directly therebetween the spacer bar and bracket to hold the bracket in place upon the bar, the jaw and the clamping means having points of impingement widely spaced apart to resist tilting.

6. A bolt adapted to fasten one member to another comprising a shank engaging one member and a fixed and an adjustable jaw on the shank for engaging opposite sides of the other member, said jaws having points of impingement widely spaced apart to resist tilting.

7. A bolt adapted to fasten one member to another comprising a shank engaging one member, and a jaw at each end of the shank for engaging opposite sides of the other member and having points of impingement widely spaced apart to resist tilting.

8. A bolt adapted to fasten a bumper bracket to an automobile frame side bar comprising a shank, a hook at one end thereof and clamping means at the other end, the end of the hook and the clamping means being adapted to grip directly therebetween the bar and the bracket to hold the bracket in place upon the bar and having points of impingement widely spaced apart to resist tilting.

9. A bolt adapted to fasten a bumper bracket to an automobile frame side bar, said bar being provided with a web and a lower lateral flange, comprising a shank, a hook at one end thereof adapted to loop over the flange with the end of the hook engaging the web, clamping means at the other end of the shank, the end of the hook and the clamping means being adapted to grip directly therebetween the web of the bar and the bracket to hold the bracket in place on the bar.

In witness whereof, I have hereunto subscribed my name.

BERNHARDT A. LINDEMER.